B. W. SWEET.
MOLDING MACHINE.
APPLICATION FILED MAY 9, 1914.

1,151,063.

Patented Aug. 24, 1915.
3 SHEETS—SHEET 1.

Witnesses

Inventor
Benjamin W. Sweet
By Victor J. Evans
Attorney

B. W. SWEET.
MOLDING MACHINE.
APPLICATION FILED MAY 9, 1914.
1,151,063.
Patented Aug. 24, 1915.
3 SHEETS—SHEET 2.
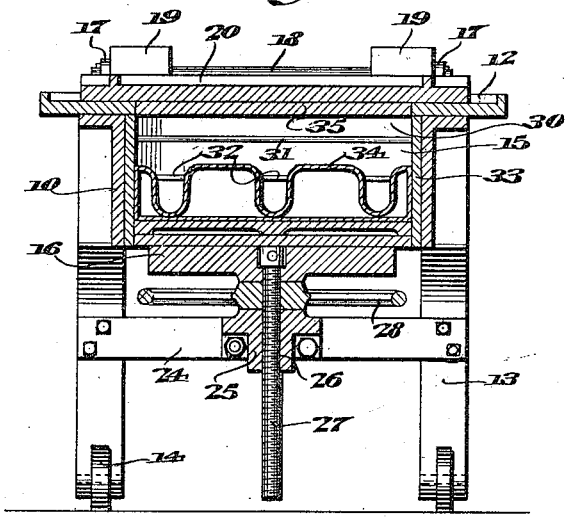
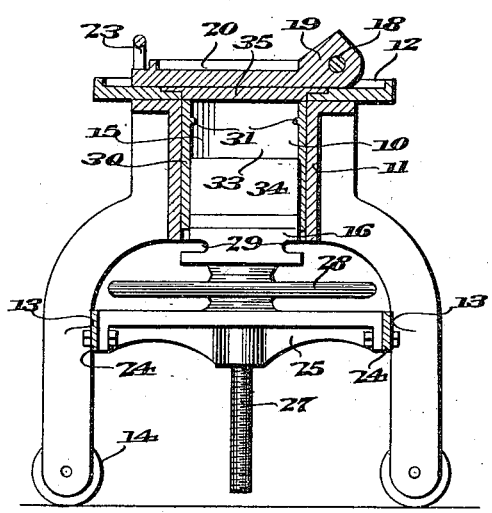
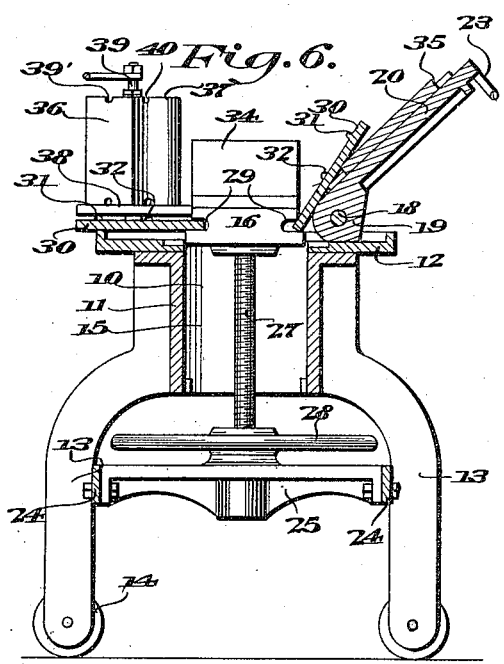
Inventor
Benjamin W. Sweet
Witnesses
By Victor J. Evans
Attorney B. W. SWEET.
MOLDING MACHINE.
APPLICATION FILED MAY 9, 1914.
1,151,063.
Patented Aug. 24, 1915.
3 SHEETS—SHEET 3.
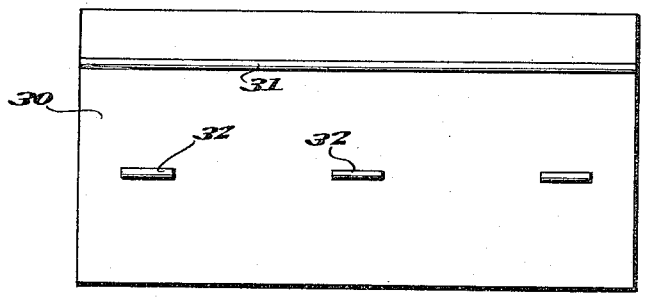
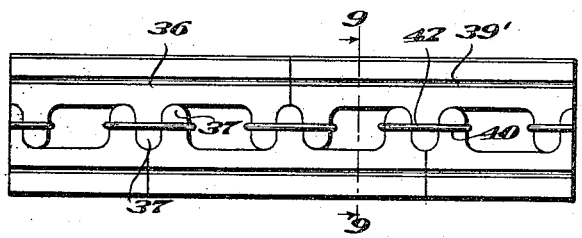
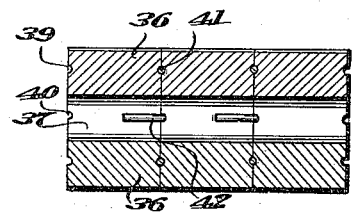
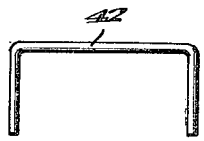
Inventor
Benjamin W. Sweet
Witnesses
By Victor J. Evans
Attorney

UNITED STATES PATENT OFFICE.

BENJAMIN W. SWEET, OF SAN FRANCISCO, CALIFORNIA, ASSIGNOR, BY MESNE ASSIGNMENTS, TO INTERLOCKING SAFETY BLOCK MACHINE COMPANY, OF SAN FRANCISCO, CALIFORNIA, A CORPORATION OF CALIFORNIA.

MOLDING-MACHINE.

1,151,063.  Specification of Letters Patent.  Patented Aug. 24, 1915.

Application filed May 9, 1914. Serial No. 837,487.

*To all whom it may concern:*

Be it known that I, BENJAMIN W. SWEET, a citizen of the United States, residing at San Francisco, in the county of San Francisco and State of California, have invented new and useful Improvements in Molding-Machines, of which the following is a specification.

The invention relates to molding machines, and more particularly to the class of interlocking block molding machine.

The primary object of the invention is the provision of a machine wherein building blocks can be molded so that the said blocks will be formed with a face or finished side and also with locking lugs so that the blocks when used can be interlocked with each other for the building of a wall.

Another object of the invention is the provision of a machine of this character wherein the lugs can be formed on the inner side of each building block, while the opposite side or outer face is positioned upward within the machine to enable the proper finishing thereof and thereby avoiding any damage to the finished face on the removal of the block from the machine.

A further object of the invention is the provision of a machine of this character wherein the walls of the mold box can be readily positioned within the machine, the mold head being of novel construction and is formed with a liner head on which rests the lug molds.

A still further object of the invention is the provision of a machine of this character which is simple in construction, thoroughly reliable, efficient, and easy of operation, and also inexpensive in manufacture.

With these and other objects in view, the invention consists in the construction, combination and arrangement of parts as will be hereinafter fully described, illustrated in the accompanying drawings, and pointed out in the claim hereunto appended.

Figure 1:
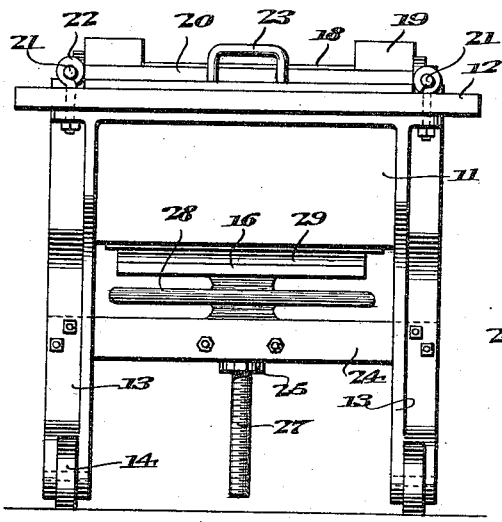
Figure 2:
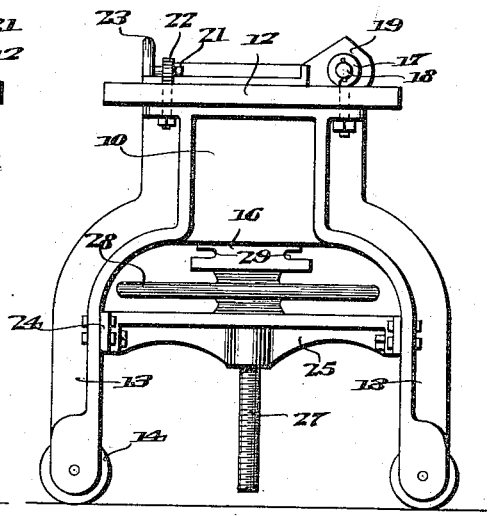
Figure 3:
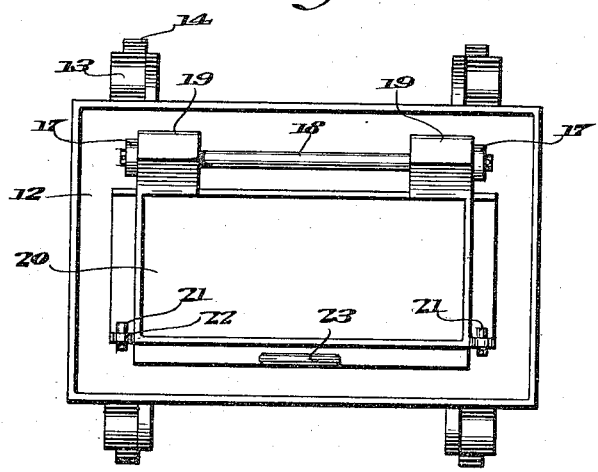

In the drawing: Figure 1 is a side elevation of a machine constructed in accordance with the invention. Fig. 2 is an end elevation thereof. Fig. 3 is a top plan view. Fig. 4 is a vertical longitudinal sectional view through the same. Fig. 5 is a vertical transverse sectional view. Fig. 6 is a similar view, showing the machine open, with a molded block resting on one side of the top thereof. Fig. 7 is a plan view, looking toward the inner face of one of the walls of the mold box of the machine. Fig. 8 is a horizontal sectional view through a series of mold blocks finished by the machine. Fig. 9 is a sectional view on the line 9—9 of Fig. 8. Fig. 10 is a side elevation of a clamp hook for locking the building blocks together.

Similar reference characters indicate corresponding parts throughout the several views in the drawings.

Referring to the drawings in detail the machine comprises a frame, the sides 10, ends 11, and top 12 constituting the same, the ends 11 being formed with legs 13 provided with wheel casters 14 which are suitably journaled in the lower ends of the legs 13 so that the frame can be shifted or moved from one point to another. The sides 10 and ends 11 are united in any desirable manner to form a mold box 15, the bottom and top of which are open, through which works a mold head 16, the same being operated in a manner presently described.

Mounted in the top 12 of the frame at one side of the central opening therein are eye bolts 17 through which is passed a pivot or pintle 18, the same being also passed through pintle sleeves 19 formed on a cover or lid 20, thereby swingingly connecting the latter to the top 12, the lid or cover 20 being locked in closed position through the medium of pins 21 which are removably engaged in eye bolts 22 fixed in the top 12 at the opposite side of the central opening therein. The lid or cover 20 is provided with a handle 23 which permits the raising or lowering thereof to opened or closed position.

Secured to the legs 13 are horizontal brace bars 24 to which is connected a bridge piece 25, the same being centrally located relative to the frame and is formed with a central guide opening 26 in which is movably mounted a feed screw 27, which has one end fastened in the mold head 16 in any suitable manner. Engaged in the feed screw 27 is a hand operated feed wheel 28 which is adapted to rest against the bridge piece 26 and on the turning thereof in one direction the mold head 16 will be raised within the mold box 15, and on the turning of the wheel 28 in the reverse direction the mold head 16 will become lowered within the said mold box.

The mold head 16 in opposite longitudinal edges thereof is formed with channels or grooves 29 in which is adapted to engage the longer edges of removable side plates 30, each being formed with a longitudinal rib 31 and a plurality of lugs 32 which serve to indent one face of the block when being molded so as to receive a reinforcing bar and clamp hook when the blocks are arranged in interlocking relation to each other for the building of a wall. The end plates 33 are removably fitted within the mold box 15 at opposite ends of the side plates 30, while positioned upon the mold head 16 is a lug mold 34 which is held in proper place and moves with the mold head 16.

Detachably secured to the inner face of the cover or lid 20 is a face or die plate 35, the same being fastened thereto in any suitable manner.

In the operation of the machine the mold head 16 is lowered the proper degree within the mold box 15 after the lug mold 34 has been positioned thereon, it being understood of course that the side and end plates 30 and 33 have been positioned within the mold box, whereupon the material is introduced into the latter, and thereafter the lid or cover 20 lowered and fastened. On manipulating the hand wheel 28 the mold head 16 is forced upwardly to give the proper pressure for casting the block. The block 36 is formed with locking lugs 37 by the lug mold 34, and after the said block has been cast the lid or cover 20 is raised and the hand wheel 28 is turned, thus moving the mold head 16 upwardly through the opening in the top. The side and end plates 30 and 33 can be moved outwardly away from the block and thereafter a pallet 38 placed upon one of the side plates 30 so that the block 36 can be turned onto the same to rest upon it and fastened by means of the clamp hook 39, the side plates 30 being formed with the ribs 31 and lugs 32 will provide in opposite faces of the molded blocks channels or recesses 39 and 40 respectively for receiving a reinforcing rod 41 and clamp hook 42 respectively, for locking the blocks together when building a wall.

It will be noted that the lugs 32 on the side plates 30 will form the recesses 40 in the lugs 37 of the block 36 so that the clamp hooks 42 can be seated in the recesses 40 for locking the lugs 37 of blocks adjacent to each other together when constructing a building wall.

From the foregoing it is thought that the construction and manner of operation of the invention will be clearly understood, and therefore a more extended explanation has been omitted.

What is claimed is:—

In a structure of the class described including a vertical mold box open at its upper end, and having a horizontal ledge adjacent said end, the combination with a follower movable within said box and having longitudinally disposed grooves in the opposite sides thereof, side and end mold boards removably arranged within said box, said side boards having their lower edge positioned within said grooves whereby said boards are moved upwardly from within said box simultaneously with said follower on movement of the latter to discharge position, one of said boards being adapted to gravitate outwardly relative to the axis of said follower and rest upon the horizontal ledge when the follower is in discharge position, and a cover for said mold.

In testimony whereof I affix my signature in presence of two witnesses.

BENJAMIN W. SWEET.

Witnesses:
 M. G. STIRLING,
 G. E. BEEBE.